United States Patent
Stepp et al.

(10) Patent No.: US 9,982,134 B2
(45) Date of Patent: May 29, 2018

(54) CROSS-LINKABLE MIXTURES HAVING ALPHA-FUNCTIONAL POLYSILOXANES

(71) Applicant: Wacker Chemie AG, Munich (DE)

(72) Inventors: Michael Stepp, Ueberackern (AT); Frank Achenbach, Simbach (DE); Andreas Koellnberger, Kirchdorf (DE)

(73) Assignee: WACKER CHEMIE AG, Munich (DE)

( * ) Notice: Subject to any disclaimer, the term of this patent is extended or adjusted under 35 U.S.C. 154(b) by 0 days. days.

(21) Appl. No.: 15/118,784

(22) PCT Filed: Feb. 10, 2015

(86) PCT No.: PCT/EP2015/052772
§ 371 (c)(1),
(2) Date: Aug. 12, 2016

(87) PCT Pub. No.: WO2015/121261
PCT Pub. Date: Aug. 20, 2015

(65) Prior Publication Data
US 2017/0044370 A1    Feb. 16, 2017

(30) Foreign Application Priority Data
Feb. 17, 2014 (DE) .................. 10 2014 202 858

(51) Int. Cl.
C08L 83/08 (2006.01)
C08G 77/12 (2006.01)
C08G 77/20 (2006.01)
C08G 77/24 (2006.01)

(52) U.S. Cl.
CPC .............. *C08L 83/08* (2013.01); *C08G 77/12* (2013.01); *C08G 77/20* (2013.01); *C08G 77/24* (2013.01); *C08L 2205/02* (2013.01); *C08L 2205/03* (2013.01); *C08L 2312/00* (2013.01)

(58) Field of Classification Search
CPC .............................. C08G 77/12; C08G 77/20
See application file for complete search history.

(56) References Cited

U.S. PATENT DOCUMENTS

| | | | |
|---|---|---|---|
| 4,500,447 A * | 2/1985 | Kobayashi ............. | C08L 83/04 252/511 |
| 5,424,385 A | 6/1995 | Hager et al. | |
| 5,500,300 A | 3/1996 | Eckberg | |
| 6,545,384 B1 | 4/2003 | Pelrine et al. | |
| 2003/0176614 A1 | 9/2003 | Hacker et al. | |
| 2005/0080216 A1* | 4/2005 | Laur ...................... | C08L 83/04 528/24 |
| 2013/0253146 A1 | 9/2013 | Krueger et al. | |

FOREIGN PATENT DOCUMENTS

| | | |
|---|---|---|
| DE | 43 17 978 A1 | 12/1994 |
| DE | 10 2010 046 343 A1 | 3/2012 |
| EP | 1818368 A1 | 8/2007 |
| JP | S4980599 A | 8/1974 |

\* cited by examiner

*Primary Examiner* — Kuo Liang Peng
(74) *Attorney, Agent, or Firm* — Brooks Kushman P.C.

(57) ABSTRACT

Vulcanizates produced by crosslinking of mixtures including alpha-functional polysiloxanes have high relative permittivities at high electric breakdown strengths which renders them suitable as a dielectric material for applications in actuators, generators or sensors in robotics, orthopedics, electrically controllable "artificial muscles," and transducers producing electricity from kinetic energy.

25 Claims, No Drawings

CROSS-LINKABLE MIXTURES HAVING ALPHA-FUNCTIONAL POLYSILOXANES

CROSS REFERENCE TO RELATED APPLICATIONS

This application is the U.S. National Phase of PCT Appln. No. PCT/EP2015/052772 filed Feb. 10, 2015, which claims priority to German Application No. 10 2014 202 858.2 filed Feb. 17, 2014, the disclosures of which are incorporated in their entirety by reference herein.

BACKGROUND OF THE INVENTION

1. Field of the Invention

The invention relates to mixtures comprising polar groups bonded via methylene groups, the mixtures being crosslinkable to give vulcanizates having high relative permittivities at high electric breakdown strengths.

2. Description of the Related Art

There is a need for dielectric elastomers for application in actuators, generators or sensors in robotics, orthopedics and other fields, for electrically controllable "artificial muscles," transducers which produce electricity from kinetic energy, and also sensors. Intelligent constructions, such as minimal energy actuators or stack actuators with very small layer thicknesses are required to obtain the best possible performance characteristics. There is a great interest in electroactive polymer actuators which are able to convert electrical energy into linear mechanical motion. Although actuators which have been able to perform deflections of more than 100 percent have already been developed, reliable and repeatable relative elongations of 10 to 30 percent, however, are the current state of art. Even these relative elongations require an operating voltage of several thousand volts.

On account of these high operating voltages, which are impractical and unsafe, scientists are researching materials which can also be operated at lower voltages. The activity of an actuator can be improved by enhancing its ability to store the electrical energy density. This corresponds to the increase in the permittivity $\varepsilon_r$ of the active material. Many approaches have led to a deterioration in the mechanical properties and reduced breakdown field strengths, above which the material suffers a catastrophic electrical breakdown.

Dielectric elastomers are suitable as base materials for artificial muscles and actorics applications. Primarily polyurethane (PU) and polydimethylsiloxane (PDMS) elastomers are discussed as possible material classes. Due to the large number of basic structures suitable for the PU and PDMS synthesis, the mechanical properties of the specified polymers can be readily adapted to the requirements of artificial muscles and actoric elements. The permittivity of the specified polymer structures, however, is usually limited to values from about 3 to 10. This gives rise to switching voltages of generally >1 kV for artificial muscles and actoric elements produced from these materials. These high switching voltages place narrow limits on the applicability of this technology. For this reason, various technical proposals and solutions have been made which have lead to a significant increase in the permittivity. Thus, by blending the specified polymers with nanoparticles of high-permittivity inorganic materials, such as barium titanate, lead zirconate, titanium dioxide etc., it is possible to significantly increase the permittivity of the elastomers such that lower switching voltages of several hundred volts can be achieved. However, these solutions have significant disadvantages which lie in a considerable impairment of the processing properties, a change to the mechanical properties of the elastomers (stiffening) and problems of homogeneous distribution of the nanoparticles in the elastomer matrix. Nanoparticles can aggregate, agglomerate and lead to problems in the formation of homogeneous elastomer films. Furthermore, nanoparticles of the specified inorganic materials are generally highly reactive as a result of their high internal surface area and may thus lead to destructuring or damage of the elastomer matrix. Furthermore, the interactions at the nanoparticle/elastomer matrix interface constitute a frequent problem that is not easy to solve when using nanoparticles for increasing the permittivity of dielectric elastomers. Actuators which consist of soft dielectric elastomers become deformed on account of the Maxwell pressure σ (Maxwell), which is induced by the electric field and interacts with the mechanical properties of the material.

$$s_z = \frac{\sigma_{Maxwell}}{E} = \frac{\varepsilon_0 \varepsilon_r E_b^2}{E} = \frac{\varepsilon_0 \varepsilon_r \left(\frac{U_b}{d}\right)^2}{E}$$

Herein, $s_z$ is the maximum deformation in the z direction, σ(Maxwell) is the electrostatic pressure from the electrodes, E is the modulus of elasticity of the material, $\varepsilon_0$ is the permittivity of the vacuum, $\varepsilon_r$ is the relative permittivity of the material, $E_b$ is the breakdown field strength, $U_b$ is the breakdown voltage and d is the thickness of the active material. It can be seen from the above equation that to achieve large elongations and low voltages, it is necessary to increase the relative permittivity and reduce the modulus of elasticity. The thickness of the electrical film can likewise be reduced, but is limited by the technical possibilities. The smallest layer thickness currently that has been realized for actoric purposes is approximately 5 μm.

DE 10 2010 046 343, the disclosure of which is incorporated herein in its entirety, describes that the attempts hitherto to increase the relative permittivity in elastomers by adding additives can only be realized with difficulty and are burdened with major disadvantages.

Dielectric elastomer actuators (DEA) are electroactive polymers which can become considerably deformed by applying an activation voltage. For this reason, they are often also referred to as "artificial muscles". These components (described for example in U.S. Pat. No. 6,545,384 B1, the disclosure of which is incorporated herein in its entirety), consist, in the simplest case, of an elastic dielectric with the thickness d which is located between two expandable electrodes. This technology has many practical advantages over conventional actuators:

high specific electromechanical energy,
deformation-based movement and consequently continuous, judder-free deflection,
noiseless,
high efficiency as a result of direct coupling to the voltage signal, and
soft materials and consequently low sensitivity to impacts.

These dielectric elastomer transducers can likewise be used in sensorics and for so-called "energy harvesting" on account of their function principle. Both fields of application have great potential. Particularly in sensorics, there are many different applications which are ripe for the market.

The current disadvantages of these actuator systems are the high operating voltages of several thousand volts. For this reason, materials with high permittivity $\varepsilon_r$, high breakdown field strength $E_b$ and low modulus of elasticity E are sought in order to increase the maximum expansion $s_z$ and to lower the operating voltage U.

Starting from this, it is therefore an object of the present invention to provide a polymer material that is suitable as a dielectric and has a high relative permittivity and high breakdown strength (breakdown field strength) which is easy to access in a cost-effective manner. Moreover, the polymer material should have high media resistance to be able to be used for the most diverse possible applications.

Polydiorganosiloxanes with polar functional groups have already been recognized as potentially suitable candidates. For example, DE 10 2010 046 343, the disclosure of which is incorporated herein in its entirety, describes siloxane additives, which are very complex to produce, for increasing the relative permittivity in (addition-crosslinking) silicone mixtures. JP 49080599, the disclosure of which is incorporated herein in its entirety, indicates that chloromethylmethylsiloxane units in linear siloxanes lead to a significant increase in the relative permittivity up to 6.2 (50 Hz) for a simultaneously high breakdown strength (41 kV at 2.5 mm).

SUMMARY OF THE INVENTION

It was therefore surprisingly and unexpectedly discovered that vulcanizates of the crosslinkable mixtures which include at least one compound containing units of the general formula 1 have relative permittivity values that are more than 50 times higher than the base polymers used and which, moreover, have very high resistance to media such as solvents and aqueous solutions.

DESCRIPTION OF THE PREFERRED EMBODIMENTS

The invention provides mixtures that are crosslinkable to give vulcanizates, the mixtures including at least one compound which contains at least one unit of the general formula 1

$$R^1_a R^2_b SiO_{(4-a-b)/2} \quad (1)$$

where
$R^1$ is a monovalent $C_1$-$C_{20}$-hydrocarbon radical,
$R^2$ is a radical —$CR^3R^4$—X and
X is a radical —F, —Cl, —Br, —I, —CN, —$NO_2$, —P(O)(OR$^5$)$_2$, —$SO_2$—(O)$_c$—$R^6$, —(O)$_d$(OC)$_e$—$R^7$, —$NR^8$—COR$^9$ or —O—SiR$^{10}_3$,
$R^3$, $R^4$ are hydrogen, or have the same meaning as $R^1$,
$R^5$, $R^6$, $R^7$, $R^8$, $R^9$, $R^{10}$ have the same meaning as $R^1$
a is 0, 1 or 2,
b is 1, 2 or 3,
c and d are 0 or 1 and
e is 0 or 1,
with the proviso that a+b≤3.

The compounds which contain at least one unit of the general formula 1 are referred to as alpha-functional polysiloxanes. Preferably, in the mixtures which are crosslinkable to give vulcanizates, at least 10%, more preferably at least 20%, most preferably 30% of all of the siloxane units present in the mixture are units of the general formula (1).

Examples of $R^1$ are alkyl (e.g. methyl, ethyl, n-propyl, isopropyl, n-butyl, isobutyl-, s-butyl, t-butyl, 1-pentyl, 2-pentyl, 1-hexyl, 1-octyl, 1-hexadecyl), cycloalkyl (e.g. cyclopentyl, cyclohexyl), alkenyl (e.g. vinyl, 2-propenyl, allyl, 3-butenyl, 5-hexenyl, 10-decenyl), cycloalkenyl (e.g. 2-cyclohexenyl, 3-cyclohexenyl, cyclopentadienyl), aryl (e.g. phenyl, naphthyl), alkylaryl (e.g. 2-phenylethyl, 1-phenylethyl), alkaryl (e.g. tolyl), where the methyl radical is preferably >30%/more preferably >50%/most preferably >60% of all radicals $R^1$.

$R^1$ preferably has 1 to 6 carbon atoms. Methyl and phenyl radicals are especially preferred.

$R^3$ and $R^4$ are preferably, independently of one another, in each case a hydrogen radical or $C_1$-$C_6$-alkyl radicals, more preferably the methyl radical, the hydrogen radical is most preferred.

X is preferably —Cl or O—$R^7$, where $R^7$ is preferably $C_1$-$C_6$-alkyl radical, more preferably methyl radical. X is most preferably —Cl.

Examples of units of the general formula 1 are:
F—$CH_2$—$SiO_{3/2}$, F—$CH_2$—$SiCH_3O_{2/2}$, F—$CH_2$—Si($CH_3$)$_2O_{1/2}$,
Cl—$CH_2$—$SiO_{3/2}$, Cl—$CH_2$—$SiCH_3O_{2/2}$, Cl—$CH_2$—Si($CH_3$)$_2O_{1/2}$,
Br—$CH_2$—$SiO_{3/2}$, Br—$CH_2$—$SiCH_3O_{2/2}$, Br—$CH_2$—Si($CH_3$)$_2O_{1/2}$,
I—$CH_2$—$SiO_{3/2}$, I—$CH_2$—$SiCH_3O_{2/2}$, I—$CH_2$—Si($CH_3$)$_2O_{1/2}$,
$H_3$CO—$CH_2$—$SiO_{3/2}$, $H_3$CO—$CH_2$—$SiCH_3O_{2/2}$, $H_3$CO—$CH_2$—Si($CH_3$)$_2O_{1/2}$,
$O_2$N—$CH_2$—$SiO_{3/2}$, $O_2$N—$SiCH_3O_{2/2}$, $O_2$N—$CH_2$—Si($CH_3$)$_2O_{1/2}$,
NC—$CH_2$—$SiO_{3/2}$, NC—$CH_2$—$SiCH_3O_{2/2}$, NC—$CH_2$—Si($CH_3$)$_2O_{1/2}$,
NC—CH($CH_3$)—$SiO_{3/2}$, NC—CH($CH_3$)—$SiCH_3O_{2/2}$, NC($CH_3$)—$CH_2$—Si($CH_3$)$_2O_{1/2}$,
PhO—$CH_2$—$SiO_{3/2}$, PhO—$CH_2$—S i$CH_3O_{2/2}$, PhO—$CH_2$—Si($CH_3$)$_2O_{1/2}$,
$PhSO_2$—$CH_2$—$SiO_{3/2}$, $PhSO_2$—$CH_2$—S i$CH_3O_{2/2}$, $PhSO_2$—$CH_2$—Si($CH_3$)$_2O_{1/2}$,
(EtO)$_2$PO—$CH_2$—$SiO_{3/2}$, (EtO)$_2$PO—$CH_2$—$SiCH_3O_{2/2}$, (EtO)$_2$PO—$CH_2$—Si($CH_3$)$_2O_{1/2}$,
$H_3$CCOO—$CH_2$—$SiO_{3/2}$, $H_3$CCOO—$CH_2$—$SiCH_3O_{2/2}$, $H_3$CCOO—$CH_2$—Si($CH_3$)$_2O_{1/2}$,
($H_3$C)$_3$SiO—$CH_2$—$SiO_{3/2}$, ($H_3$C)$_3$SiO—$CH_2$—$SiCH_3O_{2/2}$, ($H_3$C)$_3$SiO—$CH_2$—Si($CH_3$)$_2O_{1/2}$,
$H_3$CCON($CH_3$)—CH($CH_3$)—$SiO_{3/2}$, $H_3$CCON($CH_3$)—$CH_2$—$SiCH_3O_{2/2}$, $H_3$CCON($CH_3$—$CH_2$—Si($CH_3$)$_2O_{1/2}$.

Preferably, the mixtures crosslinkable to give vulcanizates are crosslinkable via hydrosilylation.

The mixtures may be single-component silicone mixtures as well as two-component silicone mixtures. In the latter case, the two components of the mixtures may include all of the constituents in any desired combination, generally with the proviso that a component does not simultaneously comprise siloxanes with aliphatic multiple bond, siloxanes with Si-bonded hydrogen and catalyst, i.e. essentially does not simultaneously comprise the constituents (A), (B) and (D) or (C) and (D1) or (D2).

As is known, the compounds (A) and (B) and (C) used in the mixtures are selected such that a crosslinking is possible. Thus, for example, compound (A) has at least two aliphatically unsaturated radicals and (B) has at least three Si-bonded hydrogen atoms, or compound (A) has at least three aliphatically unsaturated radicals and siloxane (B) has at least two Si-bonded hydrogen atoms, or instead of compound(s) (A) and (B) or in addition to compound(s) (A) and (B), siloxane (C) is used which has at least three radicals selected from aliphatically unsaturated radicals and Si-bonded hydrogen atom. Mixtures of (A) and (B) and (C) with the aforementioned ratios of aliphatically unsaturated radicals and Si-bonded hydrogen atoms are also possible. Component (D1) and (D2) is a component that promotes crosslinking.

The constituents of the mixture are preferably miscible with one another. This can preferably be achieved by adapting the polarity, i.e. similar concentration of units of the general formula (1), or by using a solubility promoter or solvent with which the components are compatible.

The compound(s) (A) may be silicon-free organic compounds with preferably at least two aliphatically unsaturated groups, as well as organosilicon compounds with preferably at least two aliphatically unsaturated groups, or mixtures thereof.

Examples of silicon-free organic compounds (A) are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylene-4,7,8,9-tetrahydroindene, methylcyclopentadiene, 5-vinyl-2-norbornene, bicyclo[2.2.1]hepta-2,5-diene, 1,3-diisopropenylbenzene, vinyl-group-containing polybutadiene, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methylheptadiene-(1,5), 3-phenylhexadiene-(1,5), 3-vinylhexadiene-(1,5 and 4,5-dimethyl-4,5-diethyloctadiene-(1,7), N,N'-methylenebisacrylamide, 1,1,1-tris(hydroxymethyl)propane triacrylate, 1,1,1-tris(hydroxymethyl)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5-triazine, triallyl-s-triazine-2,4,6(1H,3H,5H)-trione, diallylmalonic acid ester, polyethylene glycol diacrylate, polyethylene glycol dimethacrylate, poly(propylene glycol) methacrylate.

Preferably, the silicone mixtures include, as constituent (A), at least one aliphatically unsaturated organosilicon compound. It is possible to use all of the aliphatically unsaturated organosilicon compounds used hitherto in addition-crosslinking mixtures such as, for example, silicone block copolymers with urea segments, silicone block copolymers with amide segments and/or imide segments and/or ester-amide segments and/or polystyrene segments and/or silarylene segments and/or carborane segments and silicone graft copolymers with ether groups, but preferably aliphatically unsaturated organosilicon compounds which contain at least one unit of the general formula (1).

The organosilicon compounds (A) which have SiC-bonded radicals with aliphatic carbon-carbon multiple bonds are preferably linear or branched organopolysiloxanes of units of the general formula (2)

$$R^{20}{}_fR^{21}{}_gSiO_{(4-f-g)/2} \quad (2),$$

where
$R^{20}$ is a monovalent or polyvalent radical $R^a$ or $R^b$,
$R^{21}$ is a monovalent, SiC-bonded hydrocarbon radical with at least one aliphatic carbon-carbon multiple bond,
$R^a$ is a monovalent $C_1$-$C_{18}$-hydrocarbon radical free from aliphatic carbon-carbon multiple bonds,
$R^b$ is a radical of the general formula (3)

$$-(Q^b)-Y, \quad (3)$$

$Q^b$ is an unsubstituted or substituted divalent $C_2$-$C_{18}$-hydrocarbon radical,
Y is a radical F, Cl, Br, I, $CF_3$, OOC—R'OR', $[O(CH_2)_{q1}]_o$ $[OCH(CH_3)(CH_2)_{q2}]_p$—Z, —CN, —$OR^{22}$, —$NR^{22}$—, —$NR^{22}{}_2$, —$NR^{22}$—C(O)—$NR^{22}{}_2$, —C(O)—$NR^{22}{}_2$, —C(O)$R^{22}$, —C(O)$OR^{22}$, —$SO_2$-Ph or —$C_6F_5$, $R^{22}$ independently of the others is a monovalent hydrocarbon radical having 1 to 20 carbon atoms,
Ph is the phenyl radical,
Z is a radical —OH, —O—R' or —OOC—R',
R' has the meaning of $R^a$,
f is 0, 1, 2 or 3,
g is 0, 1 or 2,
q1 and q2, independently of one another, are 1, 2, 3 or 4 and
o and p, independently of one another, are numbers from 0-80,
  with the proviso that the sum f+g≤3,
  that at least two radicals $R^{21}$ are present per molecule,
  that between Y and the Si atom there is a distance of at least two carbon atoms and
  that o+p≥1.

Preferably, component (A) includes at least one unit of the general formula (1).

o and p are preferably independently of one another from 0-36, in particular 0-12.

Radical $R^{20}$ may be mono- or polyvalent radicals, where the polyvalent radicals such as, for example, bivalent, trivalent and tetravalent radicals, then join together a plurality such as, for example, two, three or four, siloxy units of the general formula (2).

Examples of radicals $R^a$ are alkyl radicals such as methyl, ethyl, n-propyl, isopropyl, n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals, such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl and methylcyclohexyl radicals, aryl radicals such as the phenyl, naphthyl, anthryl and phenanthryl radical, alkaryl radicals such as o-, m-, p-tolyl radicals, xylyl radicals and ethylphenyl radicals, and aralkyl radicals such as the benzyl radical, the α- and the β-phenylethyl radical.

Examples of substituted radicals $R^b$ are haloalkyl radicals such as the 3,3,3-trifluoro-n-propyl radical, the 2,2,2,2',2',2'-hexafluoroisopropyl radical, the heptafluoroisopropyl radical, haloaryl radicals such as the o-, m- and p-chlorophenyl radical, —$(CH_2)$—N($R^{22}$)C(O)$NR^{22}{}_2$, —$(CH_2)_q$—C(O)$NR^{22}{}_2$, —$(CH_2)_q$—C(O) $R^{22}$, —$(CH_2)_q$—C(O) $OR^{22}$, —$(CH_2)_q$—C(O)—$(CH_2)_r$C(O)$CH_3$, —$(CH_2)_q$—$NR^{22}$—$(CH_2)_r$—$NR^{22}{}_2$, —$(CH_2)_q$—O—$(CH_2)_r$CH(OH) $CH_2OH$, —$(CH_2)_q$ $(OCH_2CH_2)_rOR^{22}$, —$(CH_2)_q$—$SO_2$-Ph and —$(CH_2)_q$—O—$C_6F_5$, where $R^{22}$ and Ph correspond to the meaning given above, q are identical or different whole numbers between 2 and 10 and r are identical or different whole numbers between 0 and 10.

Examples of $R^{20}$ divalent radicals Si-bonded on both sides according to the general formula (2) are those which are derived from the monovalent examples specified above for radical $R^{20}$ such that an additional bond is formed by substitution of a hydrogen atom. Examples of such radicals are —$(CH_2)$—, —$CH(CH_3)$—, —$C(CH_3)_2$—, —CH$(CH_3)$—$CH_2$—, —$C_6H_4$—, —CH(Ph)-$CH_2$—, —C$(CF_3)_2$—, —$(CH_2)_q$—$C_6H_4$—$(CH_2)_q$—, —$(CH_2)_q$—$C_6H_4$—$C_6H_4$—$(CH_2)_q$—, —$(CH_2O)_r$, $(CH_2CH_2O)_q$, —$(CH_2)_q$—$O_x$—$C_6H_4$—$SO_2$—$C_6H_4$—$O_x$—$(CH_2)_q$—, where x is 0 or 1, and Ph, q and r have the meaning given above.

Preferably, radical $R^{20}$ is a monovalent SiC-bonded, optionally substituted hydrocarbon radical having 1 to 18 carbon atoms and free from aliphatic carbon-carbon multiple bonds, more preferably a monovalent SiC-bonded hydrocarbon radical having 1 to 6 carbon atoms and free from aliphatic carbon-carbon multiple bonds, most preferably the methyl or phenyl radical.

Radical $R^{21}$ may be any desired group accessible to an addition reaction (hydrosilylation) with a SiH-functional compound.

Preferably, radical $R^{21}$ is an alkenyl or alkynyl group having 2 to 16 carbon atoms such as vinyl, allyl, methallyl, 1-propenyl, 5-hexenyl, ethinyl, butadienyl, hexadienyl, octadienyl, octatrienyl, cyclopentenyl, cyclopentadienyl, cyclohexenyl, vinylcyclohexylethyl, divinylcyclohexylethyl, norbornenyl, vinylphenyl and styryl radicals, where vinyl, allyl and hexenyl radicals are used most preferably.

Examples and preferred meanings of $R^{22}$ are the examples and preferred meanings for $R^{20}$.

The molecular weight of the constituent (A) can vary within wide limits, preferably between $10^2$ and $10^6$ g/mol, in particular between $10^3$ and $10^5$ g/mol. Thus, the constituent (A) can be, for example, a relatively low molecular weight alkenyl-functional oligosiloxane, such as $ViSiMe_2OSiMe_2Vi$ or $ViSiMe_2$-O—$SiMe(CH_2Cl)$—O—$SiMe_2Vi$, where Vi is the vinyl radical and Me is the methyl radical, but also a highly polymeric polydimethylsiloxane having chain-position or terminal Si-bonded vinyl groups, e.g. with a molecular weight of $10^5$ g/mol (e.g. as number-average determined by means of NMR). The structure of the molecules forming the constituent (A) is also not fixed; in particular, the structure of a higher molecular weight, i.e. oligomeric or polymeric siloxane may be linear, cyclic, branched or else resin-like, network-like. Linear and cyclic polysiloxanes are preferably composed of units of the formula $R^{20}_3SiO_{1/2}$, $R^{21}R^{20}_2SiO_{1/2}$, $R^{21}_2R^{20}SiO_{1/2}$ and $R^{20}_2SiO_{2/2}$, where $R^{20}$ and $R^{21}$ have the meaning given above. Branched and network-like polysiloxanes additionally contain trifunctional and/or tetrafunctional units, where those of the formulae $R^{20}SiO_{3/2}$, $R^{21}SiO_{3/2}$ and $SiO_{4/2}$ are preferred. It is also possible to use mixtures of different siloxanes that satisfy the criteria of the constituent (A).

In a preferred variant, constituent (A) contains at least one unit of the general formula (1), more preferably at least 30%, most preferably 50% of all of the siloxane units present in the component (A) are units of the general formula (1). Preferably, at most 30% of the siloxane units of the general formula (2) are halogen-substituted, most preferably the units of the general formula (2) are the dimethylsiloxy and the vinyldimethylsiloxy group.

As component (A), particular preference is given to the use of vinyl-functional polydiorganosiloxanes with at most 0.5% of trifunctional and/or tetrafunctional units with a viscosity of from 0.01 to 1,000,000 Pa·s, more preferably from 0.1 to 200,000 Pa·s, in each case at 25° C. and a shear rate of 5 at 0.01 and 0.1 Pa·s to 0.1 l/s at 1,000,000 and 200,000 Pa·s.

Examples of compounds (A) are:
$ViSiMe_2O$—$(SiMe_2O)_{21}(SiMe(CH_2Cl)O)_{21}$—$SiMe_2Vi$
$ViSiMe_2O$—$(SiMe(CH_2Cl)O)_{218}$—$SiMe_2Vi$
$ViSiMe_2O$—$(SiMe_2O)_{75}(SiMe(CH_2Cl)O)_{201}$—$SiMe_2Vi$
$ViSiMe_2O$—$(SiMe_2O)_{144}(SiMe(CH_2Cl)O)_{148}$—$SiMe_2Vi$
$ViSiMe_2O$—$(SiMe(CH_2Cl)O)_{848}$—$SiMe_2Vi$
$ViSiMe_2O$—$(SiMe_2O)_{81}(SiMe(CH_2OMe)O)_{240}$—$SiMe_2Vi$
$ViSiMe_2O$—$(SiMe_2O)_{75}(SiMe(CH_2Cl)O)_{25}$—$SiMe_2Vi$
$ViSiMe_2O$—$(SiMe_2O)_{140}(SiMe(CH_2Cl)O)_{25}$—$SiMe_2Vi$
$ViSiMe_2O$—$(SiMe_2O)_{44}(SiMe(CH_2Cl)O)_{125}(SiMeViO)_8$—$SiMe_2Vi$
$ViSiMe_2O$—$(SiMe_2O)_{49}(SiMe(CH_2OMe)O)_{151}(SiMePhO)_{44}$—$SiMe_2Vi$
$ViSiMe_2O$—$(SiMe_2O)_{249}(SiMe(CH_2Cl)O)_{644}$—$SiMe_2Vi$
$ViSiMe_2O$—$(SiMe_2O)_{22}(SiMe(CH_2Cl)O)_{61}(SiMeO_{3/2})_{12}$—$SiMe_2Vi$.

As organosilicon compound (B), it is possible to use all hydrogen-functional organosilicon compounds that have hitherto also been used in addition-crosslinkable mixtures.

The organopolysiloxanes (B) used which have Si-bonded hydrogen atoms are preferably linear, cyclic or branched organopolysiloxanes of units of the general formula (4)

$$R^{20}_h H_i SiO_{(4-h-i)/2} \qquad (4)$$

where
$R^{20}$ has the meaning given above,
h is 0, 1, 2 or 3 and
i is 0, 1 or 2,
with the proviso that the sum of $h+i \leq 3$ and at least two Si-bonded hydrogen atoms are present per molecule. Preferably, component (B) contains at least one unit of the general formula (1).

Preferably, the organopolysiloxane (B) comprises Si-bonded hydrogen in the range from 0.04 to 1.7% by weight, based on the total weight of the organopolysiloxane (B).

The molecular weight of the constituent (B) can likewise vary within wide limits, for example between $10^2$ and $10^5$ g/mol. Thus, the constituent (B) can be, for example, a relatively low molecular weight SiH-functional oligosiloxane such as tetramethyldisiloxane or tetramethylcyclotetrasiloxane, but also a highly polymeric polydiorganylsiloxane that has SiH groups on the chain or at the ends, or a silicone resin that has SiH groups.

The structure of the molecules forming the constituent (B) is also not fixed; in particular, the structure of a higher molecular weight, i.e. oligomeric or polymeric SiH-containing siloxane, can be linear, cyclic, branched or else resin-like, network-like. Linear and cyclic polysiloxanes (B) are preferably composed of units of the formula $R^{20}_3SiO_{1/2}$, $HR^{20}_2SiO_{1/2}$, $HR^{20}SiO_{2/2}$ and $R^{20}_2SiO_{2/2}$, where $R^{20}$ has the meaning given above. Branched and network-like polysiloxanes additionally contain trifunctional and/or tetrafunctional units, where those of the formulae $R^{20}SiO_{3/2}$, $HSiO_{3/2}$ and $SiO_{4/2}$ are preferred, where $R^{20}$ has the meaning given above.

Examples of compounds (B) are:
$HSime_2O$—$(SiMe_{20})_{22}(SiMe(CH_2Cl)O)_{21}(SiMeHO)_{18}$—$SiMe_2H$
$SiMe_3O$—$(SiMeHO)_{23}(SiMe(CH_2Cl)O)_{44}$—$SiMe_3$
$SiMe_3O$—$(SiMe_2O)_6(SiMeHO)_{18}(SiMe(CH_2Cl)O)_9$—$SiMe_3$
$SiMe_3O$—$(SiMeO_{3/2})_2(SiMeHO)_{28}(SiMe(CH_2Cl)O)_{11}$—$SiMe_3$
$HSiMe_2O$—$(SiMeHO)_{14}(SiMe(CH_2OMe)O)_{21}$—$SiMe_2H$ It is also possible to use mixtures of different siloxanes that satisfy the criteria of the constituent (B). Most preferred are low molecular weight SiH-functional compounds such as tetrakis(dimethylsiloxy)silane and tetramethylcyclotetrasiloxane, as well as higher molecular weight, SiH-containing siloxanes such as poly(hydrogenmethyl)siloxane and poly(dimethylhydrogenmethyl)siloxane with a viscosity at 25° C. of from 10 to 20,000 mPa·s, at a shear rate of 5 at 10 mPa·s to l/s at 20,000 mPa·s, or analogous SiH-containing compounds in which some of the methyl groups are replaced by 3,3,3-trifluoropropyl or phenyl groups.

Preferably, constituent (B) includes at least one unit of the general formula (1), more preferably at least 30%, most preferably 50%, of all of the siloxane units present in the component (B) are units of the general formula (1).

Preferably, the general formula (4) is the methyl(H)siloxy and the dimethylsiloxy group.

Constituent (B) is preferably present in the crosslinkable silicone mixtures in an amount such that the molar ratio of SiH groups to aliphatically unsaturated groups from organosilicon compounds (A) is 0.1 to 20, most preferably between 0.3 and 2.0.

The components (A) and (B) are standard commercial products and/or can be prepared by processes customary in chemistry.

Instead of a component (A) and/or (B), the silicone mixtures can have organopolysiloxanes (C), which simultaneously have aliphatic carbon-carbon multiple bonds and Si-bonded hydrogen atoms. The silicone mixtures can also include all three components (A), (B) and (C).

If siloxanes (C) are used, they are preferably those of units of the general formulae (2) and (4) with the proviso that at least two radicals $R^{21}$ and at least two Si-bonded hydrogen atoms are present per molecule. Preferably, the siloxanes (C) comprise at least one unit of the general formula (1). If the silicone mixtures comprise no components (A) and (B), but only organopolysiloxanes (C), the siloxanes (C) contain at least one unit of the general formula (1).

Examples of organopolysiloxanes (C) are those of $SiO_{4/2}$, $R^{20}_3SiO_{1/2}$—, $R^{20}_2R^{21}SiO_{1/2}$— and $R^{20}_2HSiO_{1/2}$— units, so-called MQ resins, where these resins can additionally contain $R^{20}SiO_{3/2}$—, $R^{21}SiO_{3/2}$—, $HSiO_{3/2}$— and $R^{20}_2SiO$ units, as well as linear organopolysiloxanes essentially consisting of $R^{20}_2R^{21}SiO_{1/2}$—, $R^{20}_2SiO$— and $R^{20}HSiO$ units where $R^{20}$ and $R^{21}$ have the aforementioned meaning.

Preferably, constituent (C) includes at least one unit of the general formula (1), more preferably at least 20%, most preferably 30% of all of the siloxane units present in the component (C) are units of the general formula (1).

The organopolysiloxanes (C) preferably have an average viscosity of from 0.01 to 500,000 Pa·s, most preferably 0.1 to 100,000 Pa·s, in each case at 25° C. and a shear rate of 5 at 0.01 and 0.1 Pa·s and 0.1 1/s at 500,000 and 100,000 Pa·s.

Organopolysiloxanes (C) can be prepared by methods customary in chemistry.

Addition-crosslinking silicone compositions are selected from the group comprising
in each case at least one compound (A), (B) and (D1),
in each case at least one compound (C) and (D1), and
in each case at least one compound (A), (B), (C) and (D1)
where
(A) is an organic compound or an organosilicon compound comprising at least two radicals with aliphatic carbon-carbon multiple bonds,
(B) is an organosilicon compound comprising at least two Si-bonded hydrogen atoms,
(C) is an organosilicon compound comprising SiC-bonded radicals with aliphatic carbon-carbon multiple bonds and Si-bonded hydrogen atoms, and
(D1) is a hydrosilylation catalyst,
where all known catalysts can be used as hydrosilylation catalyst (D1). Component (D1) can be a platinum group metal, for example platinum, rhodium, ruthenium, palladium, osmium or iridium, an organometallic compound thereof or a combination thereof. Examples of component (D1) are compounds such as hexachloroplatinic(IV) acid, platinum dichloride, platinum acetylacetonate and complexes of said compounds which are encapsulated in a matrix or a core-shell-like structure. The platinum complexes with low molecular weight of the organopolysiloxanes include 1,3-diethenyl-1,1,3,3-tetramethyldisiloxane complexes with platinum. Further examples are platinum phosphite complexes, platinum phosphine complexes or alkyl platinum complexes. These compounds can be encapsulated in a resin matrix.

The concentration of component (D1) in the crosslinkable mixture is such that it suffices for the catalysis of the hydrosilylation reaction between the components (A) and (B) or component C. The amount of component (D1) in the crosslinkable mixture can be between 0.1 and 1000 parts per million (ppm), 0.5 and 100 ppm or 1 and 25 ppm of the platinum group metal. The curing rate can be low if the constituent of the platinum group metal is below 1 ppm. The use of more than 100 ppm of the platinum group metal is uneconomical or can reduce the stability of the mixture.

The mixtures crosslinkable to give vulcanizates are likewise preferably crosslinkable via organic peroxides (component D2). In this case, the mixture comprises at least the components (A) and (D2). Here, preferably between 0.1 and 20% by weight of component (D2) are present in the mixtures. Crosslinkers in the sense of component (D2) that can be used are all typical peroxides. Examples of component (D2) are dialkyl peroxides such as 2,5-dimethyl-2,5-di(tert-butylperoxy)hexane, 1,1-di-(tert-butylperoxy)cyclohexane, 1,1-di(tert-butylperoxy)-3,3,5-trimethylcyclohexane, a-hydroxyperoxy-a'-hydroxydicyclohexyl peroxide, 3,6-dicyclohexylidene-1,2,4,5-tetroxane, di-tert-butyl peroxide, tert-butyl tert-triptyl peroxide and tert-butyl-triethyl-5-methyl peroxide, diaralkyl peroxides such as dicumyl peroxide, alkylaralkyl peroxides such as tert-butylcumyl peroxide and a,a'-di(tert-butylperoxi)-m/p-diisopropylbenzene, alkylacyl proxides such as t-butyl perbenzoate, and diacyl peroxides such as dibenzoyl peroxide, bis(2-methylbenzoyl peroxide), bis(4-methylbenzoyl peroxide) and bis(2,4-dichlorobenzoyl peroxide). Preference is given to the use of vinyl-specific peroxides, the most important representatives of which are the dialkyl and diaralkyl peroxides. 2,5-dimethyl-2,5-di(tert-butylperoxi)hexane and dicumyl peroxide are most preferred. Individual peroxides or mixtures of different peroxides (D2) can be used. The content of constituent (D2) in the mixture is preferably between 0.1 and 5.0% by weight, most preferably between 0.5 and 1.5% by weight. Preference is therefore given to the crosslinkable mixtures in which the crosslinker (D2) is present from 0.1 to 5.0% by weight and constitutes an organic peroxide or a mixture of organic peroxides.

The components (A), (B) and (C) preferably include those concentrations of polar siloxane units of the general formula (1) which ensure the highest possible miscibility of the individual components and counteract spontaneous separation into different phases during storage or during application. If no other polar radicals are present which can lead to a balancing of the polarities, the concentrations of units of the general formula (1) are preferably selected as far as possible to be similar in all of the components present. In this case, the concentrations of the units of the general formula (1) in the constituents of the mixture as far as possible do not differ by more than 60%, preferably not by more than 50% and most preferably not by more than 30% from one another. The concentrations that are optimally suitable in an individual case can be ascertained easily in simple preliminary experiments by mixing.

The described mixtures can optionally include further additives such as fillers (E), which have also been used hitherto for producing peroxide- and addition-crosslinkable mixtures. Examples of reinforcing fillers which can be used as a component in the silicone mixtures are fumed or precipitated silicas with BET surface areas of at least 50 m²/g, as well as carbon blacks and activated carbons such as furnace black and acetylene black, where fumed and precipitated silicas with BET surface areas of at least 50 m²/g are preferred. The specified silica fillers can have hydrophilic character or be hydrophobicized by known processes. The content of actively reinforcing filler in the crosslinkable composition is in the range from 0 to 70% by weight, preferably 0 to 50% by weight. The crosslinkable silicone rubber mixtures, where the filler (E) has been surface-treated are most preferred. The surface treatment is achieved by known processes for hydrophobicizing finely divided fillers. The hydrophobicization can take place, for example, either prior to the incorporation into the polyorganosiloxane, or else in the presence of a polyorganosiloxane after the in-situ process. Both processes can be carried out either in the batch process or continuously. Preferably used hydrophobicizing agents are organosilicon compounds which are able to react with the filler surface to form covalent bonds or are physisorbed permanently onto the filler surface. Examples of hydrophobicizing agents are alkylchlorosilanes such as methyltrichlorosilane, dimethyldichlorosilane, trimethylchlorosilane, octyltrichlorosilane, octadecyltrichlorosilane, octylmethyldichlorosilane, octadecylmethyldichlorosilane, octyldimethylchlorosilane, octadecyldimethylchlorosilane and tert-butyldimethylchlorosilane; alkylalkoxysilanes such as dimethyldimethoxysilane, dimethyldiethoxysilane, trimethylmethoxysilane and trimethylethoxysilane; trimethylsilanol; cyclic diorgano(poly)siloxanes such as octamethylcyclotetrasiloxane, dekamethylcyclopentasiloxane; linear diorganopolysiloxanes such as dimethylpolysiloxanes with trimethylsiloxy end groups, and dimethylpolysiloxanes with silanol or alkoxy end groups; disilazanes such as hexaalkyldisilazanes, most preferably hexamethyldisilazane, divinyltetramethyldisilazane, bis(trifluoropropyl)tetramethyldisilazane; cyclic dimethylsilazanes such as hexamethylcyclotrisilazane. It is also possible to use mixtures of the aforementioned hydrophobicizing agents. In order to accelerate the hydrophobicization, it is also possible, where appropriate, to add catalytically active additives such as, for example, amines, metal hydroxides and water.

For the surface treatment of the fillers used in the mixtures most preference is given to using silanes, silazanes or siloxanes with polar groups, most preferably silicon-bonded radicals $R^2$.

Examples of silanes with polar radicals are:

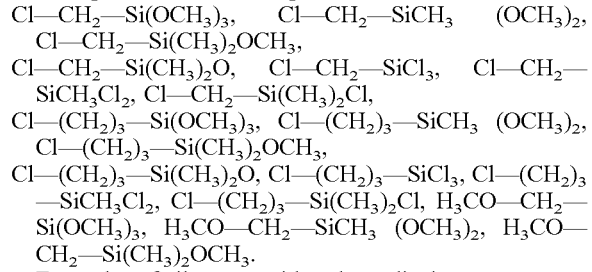

Examples of siloxanes with polar radicals are:

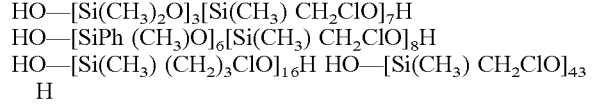

Examples of silazanes with polar radicals are:

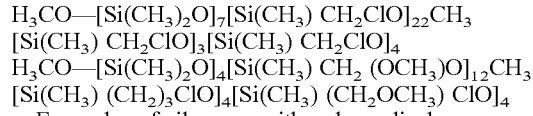
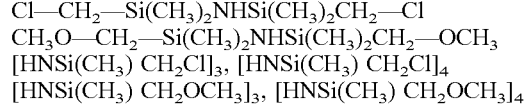

The hydrophobicization can take place, for example, in one step using one or a mixture of several hydrophobicizing agents or using one or more hydrophobicizing agents in a plurality of steps.

As a consequence of a surface treatment, preferred fillers (E) have a carbon content of at least 0.01 to at most 20% by weight, preferably between 0.1 and 10% by weight, most preferably between 0.5 to 5% by weight. The crosslinkable silicone rubber mixtures, where the filler (E) is a surface-treated silica having 0.01 to 2% by weight of Si-bonded, aliphatically unsaturated groups are most preferred. For example, these are Si-bonded vinyl groups. In the mixture, the constituent (E) is used preferably as individual fillers or likewise preferably as a mixture of a plurality of finely divided fillers.

The mixture can, if desired, include, as constituents, further additives to a fraction of up to 70% by weight, preferably 0.0001 to 40% by weight. These additives can be e.g. inactive fillers, resin-like polyorganosiloxanes which are different from the siloxanes (A), (B) and (C), reinforcing and non-reinforcing fillers, antimicrobial additives e.g. fungicides, fragrances, rheological additives, antistats, hydrophilizing additives, corrosion inhibitors, oxidation inhibitors, light protection agents, anti-inflammatory agents and agents for influencing the electrical properties, dispersion auxiliaries, solvents, adhesion promoters, pigments, dyes, plasticizers, organic polymers, heat stabilizers etc. These include additives such as quartz flour, diatomaceous earth, clays, chalk, lithopone, carbon blacks, graphite, metal oxides, metal carbonates and sulfates, metal salts of carboxylic acids, fibers such as glass fibers, plastic fibers, plastic powders, dyes, pigments etc.

These fillers can moreover be heat-conducting. Examples of heat-conducting fillers are aluminum nitride; aluminum oxide; barium titanate; beryllium oxide; boron nitride; diamond; carbon nanotubes, graphite; magnesium oxide; silicon carbide; tungsten carbide; zinc oxide and a combination thereof. Heat-conducting fillers are known and commercially available. For example, CB-A20S and Al-43-Me are aluminum oxide fillers in different particle sizes which are commercially available from Showa-Denko, and AA-04, AA-2 and AAl 8 are aluminum oxide fillers which are commercially available from Sumitomo Chemical Company. Boron nitride fillers are commercially available from Advanced Ceramics Corporation, Cleveland, Ohio, U.S.A.

The reinforcing fillers include silica and short fibers such as, for example, KEVLAR-short Fiber®. A combination of fillers with different particle sizes and different particle size distribution can be used.

The silicon composition can furthermore include one or more optional components. The examples of optional components include, inter alia, (F) one or more solvents, (G) one or more inhibitors, (H) one or more plasticizers.

The silicon composition can additionally optionally include a solvent (F). However, it is to be ensured that the solvent has no disadvantageous effects on the overall system. Suitable solvents are known and are commercially available. The solvent can be, for example, an organic solvent with 3 to 20 carbon atoms. Examples of solvents include aliphatic hydrocarbons such as, for example, nonane, decalin and dodecane; aromatic hydrocarbons such as, for example, mesitylene, xylene and toluene; chlorinated hydrocarbons such as dichloromethane and trichloromethane; esters such as, for example, ethyl acetate and butyrolactone; ethers such as, for example, n-butyl ether and polyethylene glycol monomethyl ether; ketones such as, for example, methyl isobutyl ketone and methyl pentyl ketone; silicone fluids such as, for example, linear, branched and cyclic polydimethylsiloxanes and combinations of these solvents. The optimal concentration of a specific solvent in a formulation can be determined easily through routine experiments. The amount of solvent can be between 0 and 95% or between 1 and 95%.

Inhibitors and stabilizers (G) serve for the targeted adjustment of the processing time, trigger temperature and cross-linking rate of the silicone compositions. These inhibitors and stabilizers (G) are very well known in the field of addition-crosslinking mixtures. Examples of customary inhibitors (G) are acetylenic alcohols such as 1-ethinyl-1-cyclohexanol, 2-methyl-3-butine-2-ol and 3,5-dimethyl-1-hexine-3-ol, 3-methyl-1-dodecine-3-ol, polymethylvinylcyclosiloxanes such as 1,3,5,7-tetravinyltetramethyltetracyclosiloxane, low molecular weight silicone oils with methylvinyl-SiO1/2 groups and/or R2vinylSiO1/2 end groups, such as divinyltetramethyldisiloxane, tetravinyldimethyldisiloxane, trialkyl cyanurates, alkyl maleates such as diallyl maleates, dimethyl maleate and diethyl maleate, alkyl fumarates such as diallyl fumarate and diethyl furmarate, organic hydroperoxides such as cumene hydroperoxide, tert-butyl hydroperoxide and pinane-hydroperoxide, organic peroxides, organic sulfoxides, organic amines, diamines and amides, phosphanes and phosphites, nitriles, triazoles, diaziridines and oximes. The effect of these inhibitor additives (G) depends on their chemical structure, meaning that the concentration must be determined individually. Inhibitors (G) and inhibitor mixtures (G) are preferably added in a quantitative fraction of from 0.00001% to 5%, based on the total weight of the mixture, preferably 0.00005 to 2% and most preferably 0.0001 to 1%.

To adjust the mechanical properties of the mixtures and the vulcanizates (e.g. modulus of elasticity), compounds liquid at room temperature can preferably be added as plasticizers (H). Examples of such compounds are linear or branched siloxanes which do not carry any crosslinkable functions and, as such, are either incorporated into the network (gel) or exude depending on compatibility with the remaining components of the mixture. If a good compatibility is desired, these siloxanes preferably include a fraction of siloxane units of the general formula (1).

After mixing all of the constituents, the dynamic viscosity is between 10 mPa·s (at 5 l/s) and 200,000 Pa·s (at 0.1 l/s), preferably between 100 mPa·s (at 5 l/s) and 10,000 Pas (at 0.1 l/s) and most preferably between 200 mPa·S (at 5 l/s) and 1000 Pa·s (at 0.1 l/s), in each case at 25° C.

The crosslinkable silicone mixtures have the advantage that they can be prepared economically in a simple method using readily accessible starting materials. The crosslinkable mixtures, as a single-component formulation, have the further advantage of having good storage stability at 25° C. and ambient pressure and rapidly crosslinking only at elevated temperature. The silicone mixtures, as a two-component formulation after mixing of the two components, have the advantage of producing a crosslinkable silicone mass, the processability of which is retained over a long period at 25° C. and ambient pressure, i.e. exhibit extremely long pot life and rapidly crosslink only at an elevated temperature.

All of the symbols in the formulae above have their meaning in each case independently of one another. In all of the formulae, the silicon atom is tetravalent.

In the examples below, unless stated otherwise, all amounts and percentages are based on the weight and all conversions are carried out at a pressure of 0.10 MPa (abs.).

The above viscosities relate to the measurement method described below. In the examples, the viscosities were measured on a "MCR 302" rheometer from Anton Paar in accordance with DIN EN ISO 3219: 1994 and DIN 53019, using a cone-plate system (cone CP50-2) with an opening angle of 2°. Calibration of the instrument was carried out using standard oil 10,000 from the Physikalisch-Technischen Bundesanstalt [National Metrology Institute of the Federal Republic of Germany]. The measurement temperature is 25.00° C.±0.05° C., the measurement time 3 min. The viscosity stated is the arithmetic mean of three independently performed individual measurements. The measurement uncertainty of the dynamic viscosity is 1.5%. The shear rate gradient was selected depending on the viscosity and is designated separately for each stated viscosity.

The dielectric properties of the uncrosslinked components were measured on a DIANA instrument (dielectric analyzer) from Lemke Diagnostics. The measuring cell was from Haefely Trench AG: Type 2903. Conditions were in each case room temperature, 50 Hz and 1000 V. The breakdown voltage was measured in accordance with DIN 57370 or VDE 0370 on a Dieltest DTA 100 from Baur (distance between electrodes 2.5 mm±0.02 mm, data obtained=average from 6 individual measurements).

The dielectric properties on the vulcanizate films were measured on a 4192A LF impedance analyzer from Hewlett-Packard in the range from 5 Hz to 13 MHz. For this, opposing 100 nm-thin silver electrodes with a diameter of 49 mm were applied to a 100 μm-thick, crosslinked silicone film with the help of PVD (physical vapor deposition), and the average was calculated from 10 experiments.

A) Examples Relating to Media Resistance

Preparation Example A1a

Vinyldimethylsiloxy-Terminal Polysiloxane OSi$(CH_3)CH_2Cl$:OSi$(CH_3)_2$=50:50, Chain Length 44

In a 4 L 5-neck round-bottom flask rendered inert with nitrogen and equipped with a paddle stirrer, dropping funnel, thermometer and reflux condenser, 1092 g (6.68 mol) of chloromethylmethyldichlorosilane, 1119.2 g (8.683 mol) of dimethyldichlorosilane and 120.7 g (1.002 mol) of vinyldimethylchlorosilane are heated to 30° C. With stirring, over the course of 8 h, 685.3 g (38.07 mol) of completely demineralized water are added dropwise such that the temperature of the reaction mixture does not exceed 50° C. Then, the mixture is stirred for two hours at 40° C. The liberated HCl gas is passed to a scrubber supplied with sodium hydroxide solution for neutralization. The mixture is then heated to a top temperature of 105.5° C. After cooling to 23° C., 244.5 g of 10% strength aqueous ammonium acetate solution are added. The mixture is stirred for 90 minutes and then, at 1 hPa, volatile constituents are heated to 270° C. bottom temperature. The residue is filtered in a pressure filter (filter: Beko KD3). 883.2 g of a clear oil are isolated, which has the following composition according to 29Si- and 1H-NMR:

$H_2C=CH—Si(CH_3)_2O_{1/2}$:OSi$(CH_3)CH_2Cl$:OSi$(CH_3)_2$=1:10.4:10.6 nD(25° C.): 1.4389, Density: 1.1264 g/ml $\varepsilon_r$=13.1 (23° C., 50 Hz),

Surface tension (25° C.) 27.33 mN/m SEC Mw 11,600 g/mol, Mn 3,600 g/mol, D=3.22

Preparation Example A1b

Si—H Functional Polysiloxane Crosslinker with Chloromethyl Groups (OSiCH$_2$ClCH$_3$:OSi(CH$_3$)$_2$: OSi(CH$_3$)H:$_{1/2}$OSi(CH$_3$)$_3$=9.3:6.2:17.9:2; Chain Length 35.4; 0.66% by Weight H (Si-Bonded))

a) Cohydrolysis of Chloromethylmethyldichlorosilane, Trimethylchlorosilane and Dimethyldichlorosilane.

In a 2 L 5-neck round-bottom flask rendered inert with nitrogen and equipped with a paddle stirrer, thermometer, reflux condenser and dropping funnel, 219.4 g of completely demineralized water are added dropwise over the course of 7 hours to a mixture, heated to 30° C., of 588 g (3.6 mol) of chloromethylmethyldichlorosilane, 108.3 g (1 mol) of trimethylchlorosilane and 257.5 g (2 mol) of dimethyldichlorosilane. The resulting hydrogen chloride gas is led away in an off-gas scrubber. The mixture is heated at reflux (110° C.) for 2 hours and then, at 3 hPa, volatile constituents are distilled off up to 250° C. bottom temperature. Remaining as residue are 369.5 g of a clear, colorless liquid which, according to $^{29}$Si- and $^1$H-NMR spectrum, has the following composition (="Hydrolysate a)"):

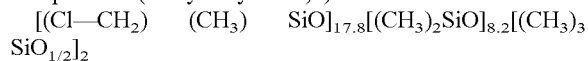

b) Equilibration of the Chloromethylmethyldimethylpolysiloxane from a) with Silicone Oil AKIO and H-Siloxane.

In a 1 L 4-neck round-bottom flask rendered inert with nitrogen and equipped with a paddle stirrer, dropping funnel, thermometer and distillation attachment, 360 g of the chloromethylmethyldimethylpolysiloxane from a) are initially introduced and heated to 100° C. with stirring. Then, a mixture of 313.5 g of WACKER@ H-siloxane and 57.5 g of WACKER@ AKIO silicone oil are added, as well as 1.5 g of a 10% strength solution of equilibration catalyst "PNC12" in ethyl acetate (as described in DE4317978, example 1). The mixture is stirred for two hours at 100° C. and then 50 hPa vacuum is applied for 5 minutes. The addition of in each case 1.5 g of PNC12 catalyst is repeated twice after a reaction time of 2 h in each case at 100° C. The mixture is cooled to 50° C., 35 g of a 10% strength aqueous ammonium acetate solution are added to the reaction mixture, which is stirred for 30 minutes at 30° C. and volatile constituents are distilled off in vacuum (1 hPa) up to 150° C. The cooled opalescent residue is filtered over a pressure filter (Seitz-EK® filter). 653 g of a clear, colorless oil are isolated, which has a density of 1.076 g/ml [20° C.] and, according to $^{29}$Si- and $^1$H-NMR spectrum, the following average formula:

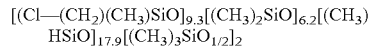

Preparation of Silicone Elastomers

Example A2a (Comparative Example)

42.6 g of a vinyldimethylsiloxy-terminated polydimethylsiloxane with a kinematic viscosity of 103 mm$^2$/s (25° C.; DIN 51562; WACKER CHEMIE AG) are mixed at room temperature with 0.07 g of Speier catalyst (1% strength by weight solution of hexachloroplatinic acid hexahydrate in isopropanol) and 1.7 g of 1,3,5,7-tetramethylcyclotetrasiloxane (ABCR GmbH & Co. KG; Gelest). The mixture is then poured into a Teflon® dish and crosslinked for 2 hours at 100° C. in a circulating-air drying cabinet. This gives a silicone elastomer plate 6 mm in thickness with a Shore A hardness (DIN 53505) of 10.3 and a density of 1.06 g/cm$^3$ (23° C.; ISO 2781).

Example A2b (According to the Invention)

42.0 g of polysiloxane from example A1a are mixed with 0.07 g of Speier catalyst (1% strength by weight solution of hexachloroplatinic acid hexahydrate in isopropanol) and 2.35 g of 1,3,5,7-tetramethylcyclotetrasiloxane (ABCR GmbH & Co.KG; Gelest) at room temperature. The mixture is then poured into a Teflon® dish and crosslinked for 2 hours at 100° C. in a circulating-air drying cabinet. This gives a silicone elastomer with a Shore A hardness (DIN 53505) of 9.0 and a density of 1.13 g/cm$^3$ (23° C.; ISO 2781).

Example A2c (According to the Invention)

38.92 g of polysiloxane from example A1a) are mixed with 0.07 g of Speier catalyst (1% strength by weight solution of hexachloroplatinic acid hexahydrate in isopropanol) and 5.45 g of polymer from example A1b at room temperature. The mixture is then poured into a Teflon® dish and crosslinked for 2 hours at 100° C. in a circulating-air drying cabinet. This gives a silicone elastomer with a Shore A hardness (DIN 53505) of 23.4 and a density of 1.13 g/cm$^3$ (23° C.; ISO 2781).

The volume swelling is determined by punching cylindrical sample bodies with a diameter of 6 mm from the 6 mm-thick silicone elastomer plates (5 items per material). The sample bodies of one material are in each case placed in 100 ml of the respective solvent and stored at room temperature for one week in a closed glass vessel. After the storage time has expired, the sample body is taken out, quickly patted with absorbent paper and weighed without delay. The percentage volume swelling Qv of a material is determined by averaging the values determined on the 5 sample bodies according to the formula $Qv$=[(Mass increase of the sample body)/(Density of the solvent)]×[(Density of the unswollen sample body)/(Mass of the unswollen sample body)]× 100%.

TABLE 1

| | | Volume swelling | | |
| --- | --- | --- | --- | --- |
| Solvent | Density of solvent [g/cm$^3$] | Volume swelling Qv [%] | | |
| | | Example A2a*) | Example A2b | Example A2c |
| n-Heptane | 0.68 | 775 | 143 | 96 |
| Cyclohexane | 0.78 | 801 | 182 | 113 |
| Toluene | 0.87 | 521 | 219 | 133 |
| Chloroform | 1.48 | 753 | 270 | 159 |
| 2-Butanone | 0.81 | 224 | 199 | 123 |
| Tetrahydrofuran | 0.89 | 808 | 272 | 154 |

*)not according to the invention

As the values in table 1 show, the chloromethyl-containing silicone elastomers have a considerably lower swelling in solvents.

B) Examples Relating to the Particular Dielectric Properties of the Vulcanizates of the Mixtures According to the Invention

Example B1

Preparation of Basic Mixture 1 (BM 1)

78.0 g of α,ω-dimethylvinylsilyl-end-blocked chloromethylmethylpolysiloxane with an average chain length of 220 (vinyl content 0.082 mmol/g, $\varepsilon_r$=7.4 (23° C., 50 Hz)) are initially introduced in a kneader with the volume 200 ml. At room temperature, over the course of 35 minutes, 78.0 g of fumed silica prehydrophobicized with trimethylsilyl groups and with a BET surface area of 130 m$^2$/g in accordance with DIN EN ISO 9277 are kneaded in. This produces a high-viscosity mass which is heat-treated in the kneader for one hour at 150° C. After cooling to about 50° C., 78.0 g of the aforementioned polymer are added to establish the silica fraction at 33.3%. The dynamic viscosity is 380,000 mPa·s at 25° C. and a shear rate of 1 s$^{-1}$.

Preparation of the Two-Component, Addition-Crosslinking Composition 1:

To prepare the component A, 3.22 g of a linear comb crosslinker K1 on average consisting of 59.4 mol % of chloromethyl-methylsiloxy and 40.6 mol % of hydrogenmethylsiloxy units with an average chain length over all units of 60 are added to 100 g of the basic mixture 1. The Si—H content of the crosslinker is 4.4 mol/g.

To produce the component B, 10.08 g of 1-ethinylcyclohexanol (=inhibitor) and 20 ppm of a platinum divinyldisiloxane complex (=Karstedt catalyst, 20 ppm based on the metal Pt) are added to 100 g of the basic mixture and stirred at room temperature using a paddle stirrer for 10 minutes at a speed of 200 rpm. By stirring (room temperature, paddle stirring, 10 min at approx. 200 rpm) the two components A and B in the ratio 1:1, a crosslinkable mixture is prepared, the Si—H/Si-vinyl ratio of which is 1.3. The vulcanization takes place at 160° C. in a drying cabinet, time 20 min.

The hardness of the vulcanizate is 35 Shore A according to ISO 868, the tear-propagation resistance according to ASTM D 624 B is 4.3 N/mm, the elongation at tear in accordance with ISO 37 is 200%, tear strength according to ISO 37 is 2.0 N/mm$^2$. At a layer thickness of 100 μm, the breakdown voltage in accordance with ASTM D 3755 is 50 kV/ram. The relative permittivity $\varepsilon_r$ at 10 Hz is 1200, the permittivity $\varepsilon_r$ at 100 kHz is 6.8.

Example B2

Preparation of the Basic Mixture 2 (BM 2)

The abbreviation CMM stands for chloromethylmethyl. 60.0 g of α,ω-dimethylvinylsilyl-end-blocked chloromethylmethylsiloxane-dimethylsiloxane copolymer OSi(CH$_3$)CH$_2$Cl:OSi(CH$_3$)$_2$=73:27, $\varepsilon_r$=16.9 (23° C., 50 Hz) with an average chain length of 278 (vinyl content 0.072 mmol/g) are initially introduced into a kneader with a volume of 200 ml. At room temperature over the course of 35 minutes, 60.0 g of fumed silica prehydrophobicized with trimethylsilyl groups and with a BET surface area of 130 m$^2$/g in accordance with DIN EN ISO 9277 are kneaded in. This produces a highly viscous mass which is heat-treated in the kneader for one hour at 150° C. After cooling to about 50° C., a further 60.0 g of the aforementioned polymer are added to adjust the silica fraction to 33.3%. The dynamic viscosity is 160,000 mPa·s at 25° C. and a shear rate of 1 s'.

Preparation of the Two-Component, Addition-Crosslinking Composition 1:

To prepare the component A, 2.9 g of a linear comb crosslinker K1, on average consisting of 59.4 mol % of chloromethylmethylsiloxy and 40.6 mol % of hydrogenmethylsiloxy units with an average chain length over all units of 60, are added to 100 g of the basic mixture 1. The Si—H content of the crosslinker is 4.4 mmol/g.

To produce the component B, 10.08 g of 1-ethinylcyclohexanol (=inhibitor) and 20 ppm of a platinum-divinyldisiloxane complex (=Karstedt catalyst, 20 ppm based on the metal Pt) are added to 100 g of the basic mixture and stirred at room temperature using a paddle stirrer for 10 minutes at a rotary speed of 200 rpm.

By stirring (RT, paddle stirrer, 10 min at approx. 200 rpm) the two components A and B in the ratio 1:1, a crosslinkable mixture is prepared, the Si—H/Si-vinyl ratio of which is 1.3. The vulcanization takes place at 160° C. in the drying cabinet, time 20 min.

The hardness of the vulcanizate is 20 Shore A according to ISO 868, the tear-propagation resistance according to ASTM D 624 B is 0.5 N/mm, the elongation at tear according to ISO 37 is 100%, tear strength according to ISO 37 is 2.0 N/mm$^2$. At a layer thickness of 100 μm, the breakdown voltage according to ASTM D 3755 is 60 kV/mm. The relative permittivity $\varepsilon_r$ at 10 Hz is 1300, the permittivity $\varepsilon_r$ at 100 kHz is 6.0.

Example B3

Preparation of the Basic Mixture 3 (BM 1)

67.9 g of α,ω-dimethylvinylsilyl-end-blocked chloromethylmethylpolysiloxane with an average chain length of 220, 1.21 g of 1,3-bis(chloromethyl)-1,1,3,3-tetramethyldisilazane (Aldrich), 0.84 g of hexamethyldisilazane and 0.82 g of deionized water (vinyl content of the polymer 0.082 mmol/g, $\varepsilon_r$=7.4 (23° C., 50 Hz)) are initially introduced in a kneader with a volume of 200 ml. At room temperature, over the course of 25 minutes, 47.9 g are kneaded in with fumed silica with a BET surface area of 130 m$^2$/g according to DIN EN ISO 9277 (HDK® S13). This gives a high-viscosity mass which is heat-treated in the kneader for one hour at 150° C. and a vacuum of 20 mbar. After cooling to about 110° C., 50.1 g of the aforementioned polymer are added. After a kneading time of 10 min, 1.0 g of demineralized water is added and the mixture is kneaded for one hour at 150° C. at a vacuum of 20 mbar. The dynamic viscosity is 73,000 mPa·s at 25° C. and a shear rate of 2 s$^{-1}$.

Preparation of the Two-Component, Addition-Crosslinking Composition 1:

To prepare the crosslinkable mixture, 3.9 g of a linear comb crosslinker K1, on average consisting of 59.4 mol % of chloromethyl-methylsiloxy and 40.6 mol % of hydrogen-methylsiloxy units with an average chain length over all units of 60 are added to 124 g of the basic mixture 3. The Si—H content of the crosslinker is 4.4 mmol/g. After adding 0.05 g of 1-ethinylcyclohexanol, 10 ppm (based on the metal) of a platinum catalyst (=Karstedt catalyst) are added and the mixture is stirred for 10 min at room temperature using a paddle stirrer at a speed of 200 rpm. The vulcanization takes place by compression at 180° C. in a compression mold, time 20 min.

The hardness of the vulcanizate is 47 Shore A according to ISO 868, the tear-propagation resistance according to ASTM D 624 B is 7.7 N/mm, the elongation at tear according to ISO 37 is 150%, tear strength according to ISO 37 is 5.2 N/mm². At a layer thickness of 100 μm, the breakdown voltage according to ASTM D 3755 is 50 kV/mm. The relative permittivity $\varepsilon_r$ at 10 Hz is 1200, the permittivity $\varepsilon_r$ at 100 kHz is 6.8.

Preparation of the Linear Comb Crosslinker K1:

Si—H Functional Polysiloxane Crosslinker with Chloromethyl Groups $(OSiCH_2ClCH_3:OSi(CH_3)H:_{1/2}OSi(CH_3)_3=33.6:23:2$; Chain Length ~60; 0.44% by Weight H (Si-Bonded))

a) Cohydrolysis of Chloromethylmethyldichlorosilane, Trimethylchlorosilane and Dimethyldichlorosilane In a 4 L 5-neck round-bottom flask rendered inert with nitrogen and equipped with a paddle stirrer, thermometer, reflux condenser and dropping funnel, 438.6 g of completely demineralized water are metered in, with stirring, over the course of 5 hours to a mixture, heated to 30° C., of 1600 g (9.79 mol) of chloromethylmethyldichlorosilane and 79.7 g (0.734 mol) of trimethylchlorosilane. The hydrogen chloride gas that is formed is led away to an offgas scrubber. The mixture is after-reacted for 2 hours at 40° C., and volatile constituents are then distilled off firstly at atmospheric pressure up to 155° C. bottom temperature, then at 100° C. and 2 hPa. After cooling to 30° C., 156.5 g of 10% strength aqueous ammonium acetate solution are added. The mixture is stirred for one hour at 30° C., then a vacuum is applied, and volatile constituents are distilled off at 1 hPa up to 240° C. bottom temperature (176° C. top temperature). The residue is filtered by means of a pressure filter over a filter with mesh width 0.25-0.35 μm. 766.5 g of a clear, colorless liquid are isolated which, according to ²⁹Si- and ¹H-NMR spectrum, has the following composition:

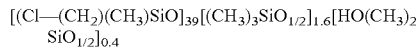

[(Cl—(CH₂)(CH₃)SiO]₃₉[(CH₃)₃SiO₁/₂]₁.₆[HO(CH₃)₂SiO₁/₂]₀.₄ b) Equilibration of the Chloromethylmethyldimethylpolysiloxane from a) with H-Siloxane.

In a 2 L 4-neck round-bottomed flask rendered inert with nitrogen and equipped with a paddle stirrer, dropping funnel, thermometer and distillation attachment, a mixture of 555 g of the chloromethylmethylpolysiloxane from a) and 239.1 g of WACKER@ H-siloxane is initially introduced and heated to 100° C. with stirring. Then, 1.77 ml of a 10% strength solution of equilibration catalyst "PNC12" in ethyl acetate (as described in DE4317978, example 1) are added. The mixture is stirred for 2 hours at 100° C. and then 50 hPa vacuum is applied for 5 minutes. The addition of in each case 1.77 ml of PNC12 catalyst is repeated twice after in each case 2 h reaction time at 100° C. The mixture is cooled to 50° C., 36.5 g of a 10% strength aqueous ammonium acetate solution are added to the reaction mixture, which is stirred for 30 minutes at 30° C., and volatile constituents are distilled off in vacuum (1 hPa) up to 170° C. The cooled residue is filtered over a pressure filter (Seitz-EKED filter, 0.3-0.5 μm). 714.8 g of a clear, colorless oil are isolated which, according to ²⁹Si- and ¹H-NMR spectrum, has the following average formula:

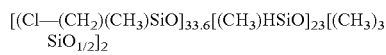

[(Cl—(CH₂)(CH₃)SiO]₃₃.₆[(CH₃)HSiO]₂₃[(CH₃)₃SiO₁/₂]₂

Relative permittivity: $\varepsilon_r$=5.8 (23° C., 50 Hz)

The invention claimed is:

1. A mixture crosslinkable to give a vulcanizate, the mixture comprising:

at least one compound comprising at least one unit of the formula (1):

$$R^1_a R^2_b SiO_{(4-a-b)/2} \tag{1}$$

wherein $R^1$ is a monovalent $C_1$-$C_{20}$-hydrocarbon radical, $R^2$ is a radical —$CR^3R^4$—X, and X is a radical —F, —Cl, —Br, —I, —CN, —NO₂, —P(O)(OR⁵)₂, —SO₂—(O)$_c$—R⁶, —(O)$_d$(OC)$_e$—R⁷, —NR⁸—COR⁹ or —O—SiR¹⁰₃, $R^3$, $R^4$ are hydrogen or monovalent $C_1$-$C_{20}$-hydrocarbon radicals, $R^5$, $R^6$, $R^7$, $R^8$, $R^9$, $R^{10}$ are monovalent $C_1$-$C_{20}$-hydrocarbon radicals, a is 0, 1 or 2, b is 1, 2 or 3, c and d are 0 or 1, and e is 0 or 1, with the proviso that a+b≤3, and a compound (A) and a compound (B), wherein the compound (A) has at least two aliphatically unsaturated radicals and the compound (B) has at least three Si-bonded hydrogen atoms or the compound (A) has at least three aliphatically unsaturated radicals and the compound (B) is a siloxane having at least two Si-bonded hydrogen atoms, or a siloxane (C) having both aliphatic carbon-carbon multiple bonds and Si-bonded hydrogen atoms and either optionally a compound (A) or a compound (B), wherein the compound (A) has at least two aliphatically unsaturated radicals and the compound (B) is a siloxane having at least two Si-bonded hydrogen atoms; or optionally a mixture of the compound (A) and the compound (B) wherein the compound (A) has at least two aliphatically unsaturated radicals and the compound (B) is a siloxane having at least three Si-bonded hydrogen atoms or the compound (A) has at least three aliphatically unsaturated radicals and the compound (B) is a siloxane having at least two Si-bonded hydrogen atoms, wherein the compound (A) is an organosilicon compound (A) comprising units of the formula (2):

$$R^{20}_f R^{21}_g SiO_{(4-f-g)/2} \tag{2}$$

wherein $R^{20}$ is a monovalent radical $R^a$ or $R^b$, $R^{21}$ is a monovalent, SiC-bonded hydrocarbon radical with at least one aliphatic carbon-carbon multiple bond, $R^a$ is a monovalent $C_1$-$C_{18}$-hydrocarbon radical free from aliphatic carbon-carbon multiple bonds, $R^b$ is a radical of the formula (3):

$$-(Q^b)-Y \tag{3},$$

$Q^b$ is an unsubstituted or substituted divalent $C_2$-$C_{18}$-hydrocarbon radical, Y is a radical F, Cl, Br, I, CF₃, OOC—R'OR', [O(CH₂)$_{q1}$]$_o$[OCH(CH₃)(CH₂)$_{q2}$]$_p$—Z, —CN, —OR²², —NR²²₂, —NR²²—C(O)—NR²²₂, —C(O)—NR²²₂, —C(O)R²², —C(O)OR²², —SO₂-Ph or —C₆F₅, $R^{22}$ is independently a monovalent hydrocarbon radical having 1 to 20 carbon atoms, Ph is the phenyl radical, Z is a radical —OH, —O—R' or —OOC—R', R' is a monovalent $C_1$-$C_{18}$-hydrocarbon radical free from aliphatic carbon-carbon multiple bonds, f is 0, 1, 2 or 3, g is 0, 1 or 2, q1 and q2 are independently 1, 2, 3 or 4 and o and p are independently numbers from 0-80, with the proviso that f+g≤3, that at least two radicals $R^{21}$ are present per molecule, that at least two carbon atoms separate Y and the Si atom, and that o+p≥1, and wherein at least one of compounds (A), (B), and (C) contain at least one unit of the formula (1).

2. The mixture of claim 1, wherein at least 10% of all siloxane units present in the mixture are units of the formula (1).

3. The mixture of claim 1, wherein $R^1$ has 1 to 6 carbon atoms.

4. The mixture of claim 1, wherein $R^3$ and $R^4$ are hydrogen radicals.

5. The mixture of claim 1, wherein $R^{20}$ is a monovalent SiC-bonded hydrocarbon radical having 1 to 6 carbon atoms and being free from aliphatic carbon-carbon multiple bonds.

6. The mixture of claim 1, wherein the mixture is crosslinkable via organic peroxide(s) (D2).

7. The mixture of claim 1, wherein the compound (B) is an organosilicon compound (B) comprising units of the formula (4):

$$R^{20}{}_h H_i SiO_{(4-h-i)/2} \quad (4),$$

wherein $R^{20}$ is a monovalent radical $R^a$ or $R^b$, h is 0, 1, 2 or 3, and i is 0, 1 or 2, with the proviso that h+i≤3 and at least two Si-bonded hydrogen atoms are present per molecule.

8. The mixture of claim 7, wherein the compound (C) is a siloxane comprising units of the formulae (2) and (4) with the proviso that at least two radicals $R^{21}$ and at least two Si-bonded hydrogen atoms are present per molecule.

9. A mixture crosslinkable to give a vulcanizate, the mixture comprising:

at least one compound comprising at least one unit of the formula (1):

$$R^1{}_a R^2{}_b SiO_{(4-a-b)/2} \quad (1)$$

wherein $R^1$ is a monovalent $C_1$-$C_{20}$-hydrocarbon radical, $R^2$ is a radical —$CR^3R^4$—X, and X is a radical —F, —Cl, —Br, —I, —CN, —$NO_2$, —$P(O)(OR^5)_2$, —$SO_2$—$(O)_c$—$R^6$, —$(O)_d(OC)_e$—$R^7$, —$NR^8$—$COR^9$ or —O—$SiR^{10}{}_3$, $R^3$, $R^4$ are hydrogen or monovalent $C_1$-$C_{20}$-hydrocarbon radicals, $R^5$, $R^6$, $R^7$, $R^8$, $R^9$, $R^{10}$ are monovalent $C_1$-$C_{20}$-hydrocarbon radicals, a is 0, 1 or 2, b is 1, 2 or 3, c and d are 0 or 1, and e is 0 or 1, with the proviso that a+b≤3, and a compound (A) and a compound (B), wherein the compound (A) has at least two aliphatically unsaturated radicals and the compound (B) has at least three Si-bonded hydrogen atoms or the compound (A) has at least three aliphatically unsaturated radicals and the compound (B) is a siloxane having at least two Si-bonded hydrogen atoms, or a siloxane (C) having both aliphatic carbon-carbon multiple bonds and Si-bonded hydrogen atoms and either optionally a compound (A) or a compound (B), wherein the compound (A) has at least two aliphatically unsaturated radicals and the compound (B) is a siloxane having at least two Si-bonded hydrogen atoms; or optionally a mixture of the compound (A) and the compound (B) wherein the compound (A) has at least two aliphatically unsaturated radicals and the compound (B) is a siloxane having at least three Si-bonded hydrogen atoms or the compound (A) has at least three aliphatically unsaturated radicals and the compound (B) is a siloxane having at least two Si-bonded hydrogen atoms, wherein the compound (B) is an organosilicon compound (B) comprising units of the formula (4):

$$R^{20}{}_h H_i SiO_{(4-h-i)/2} \quad (4),$$

wherein $R^{20}$ is a monovalent radical $R^a$ or $R^b$, $R^a$ is a monovalent $C_1$-$C_{18}$-hydrocarbon radical free from aliphatic carbon-carbon multiple bonds, $R^b$ is a radical of the formula (3):

$$-(Q^b)-Y \quad (3),$$

$Q^b$ is an unsubstituted or substituted divalent $C_2$-$C_{18}$-hydrocarbon radical, Y is a radical F, Cl, Br, I, $CF_3$, OOC—R'OR', [O$(CH_2)_{q1}]_o[OCH(CH_3)(CH_2)_{q2}]_p$—Z, —CN, —$OR^{22}$, —$NR^{22}{}_2$, —$NR^{22}$—C(O)—$NR^{22}{}_2$, —C(O)—$NR^{22}{}_2$, —C(O)$R^{22}$, —C(O)$OR^{22}$, —$SO_2$-Ph or —$C_6F_5$, $R^{22}$ is independently a monovalent hydrocarbon radical having 1 to 20 carbon atoms, Ph is the phenyl radical, Z is a radical —OH, —O—R' or —OOC—R', R' is a monovalent $C_1$-$C_{18}$-hydrocarbon radical free from aliphatic carbon-carbon multiple bonds, h is 0, 1, 2 or 3, and i is 0, 1 or 2, with the proviso that h+i≤3 and at least two Si-bonded hydrogen atoms are present per molecule, and wherein at least one of compounds (A), (B), and (C) contain at least one unit of the formula (1).

10. The mixture of claim 9, wherein the mixture is crosslinkable via organic peroxide(s) (D2).

11. A mixture crosslinkable to give a vulcanizate, the mixture comprising:

at least one compound comprising at least one unit of the formula (1):

$$R^1{}_a R^2{}_b SiO_{(4-a-b)/2} \quad (1)$$

wherein $R^1$ is a monovalent $C_1$-$C_{20}$-hydrocarbon radical, $R^2$ is a radical —$CR^3R^4$—X, and X is a radical —Br, —I, —CN, —$NO_2$, —$P(O)(OR^5)_2$, —$SO_2$—$(O)_c$—$R^6$, —$(O)_d(OC)_e$—$R^7$, —$NR^8$—$COR^9$ or —O—$SiR^{10}{}_3$, $R^3$, $R^4$ are hydrogen or monovalent $C_1$-$C_{20}$-hydrocarbon radicals, $R^5$, $R^6$, $R^7$, $R^8$, $R^9$, $R^{10}$ are monovalent $C_1$-$C_{20}$-hydrocarbon radicals, a is 0, 1 or 2, b is 1, 2 or 3, c and d are 0 or 1, and e is 0 or 1, with the proviso that a+b≤3, and a compound (A) and a compound (B), wherein the compound (A) has at least two aliphatically unsaturated radicals and the compound (B) has at least three Si-bonded hydrogen atoms or the compound (A) has at least three aliphatically unsaturated radicals and the compound (B) is a siloxane having at least two Si-bonded hydrogen atoms, and a siloxane (C) having both aliphatic carbon-carbon multiple bonds and Si-bonded hydrogen atoms and optionally a compound (A) or a compound (B), wherein the compound (A) has at least two aliphatically unsaturated radicals and the compound (B) is a siloxane having at least two Si-bonded hydrogen atoms.

12. The mixture of claim 11, wherein at least 10% of all siloxane units present in the mixture are units of the formula (1).

13. The mixture of claim 11, wherein $R^1$ has 1 to 6 carbon atoms.

14. The mixture of claim 11, wherein $R^3$ and $R^4$ are hydrogen radicals.

15. The mixture of claim 11, wherein the compound (A) is an organosilicon compound (A) comprising units of the formula (2):

$$R^{20}_f R^{21}_g SiO_{(4-f-g)/2} \quad (2),$$

wherein
$R^{20}$ is a monovalent radical $R^a$ or $R^b$,
$R^{21}$ is a monovalent, SiC-bonded hydrocarbon radical with at least one aliphatic carbon-carbon multiple bond,
$R^a$ is a monovalent $C_1$-$C_{18}$-hydrocarbon radical free from aliphatic carbon-carbon multiple bonds,
$R^b$ is a radical of the formula (3):

$$-(Q^b)-Y \quad (3),$$

$Q^b$ is an unsubstituted or substituted divalent $C_2$-$C_{18}$-hydrocarbon radical,
Y is a radical F, Cl, Br, I, $CF_3$, OOC—R'OR', [O$(CH_2)_{q1}]_o$[OCH($CH_3$)($CH_2)_{q2}]_p$—Z, —CN, —OR$^{22}$, —NR$^{22}_2$, —NR$^{22}$—C(O)—NR$^{22}_2$, —C(O)—NR$^{22}_2$, —C(O)R$^{22}$, —C(O)OR$^{22}$, —SO$_2$-Ph or —C$_6$F$_5$,
$R^{22}$ is independently a monovalent hydrocarbon radical having 1 to 20 carbon atoms,
Ph is the phenyl radical,
Z is a radical —OH, —O—R' or —OOC—R',
R' is a monovalent $C_1$-$C_{18}$-hydrocarbon radical free from aliphatic carbon-carbon multiple bonds,
f is 0, 1, 2 or 3,
g is 0, 1 or 2,
q1 and q2 are independently another 1, 2, 3 or 4 and
o and p are independently numbers from 0-80,
with the proviso that f+g≤3,
that at least two radicals $R^{21}$ are present per molecule,
that at least two carbon atoms separate Y and the Si atom, and
that o+p≥1.

16. The mixture of claim 15, wherein $R^{20}$ is a monovalent SiC-bonded hydrocarbon radical having 1 to 6 carbon atoms, free from aliphatic carbon-carbon multiple bonds.

17. The mixture of claim 15, wherein the compound (B) is an organosilicon compound (B) comprising units of the formula (4):

$$R^{20}_h H_i SiO_{(4-h-i)/2} \quad (4),$$

wherein
$R^{20}$ is a monovalent radical $R^a$ or $R^b$,
h is 0, 1, 2 or 3, and
i is 0, 1 or 2,
with the proviso that h+i≤3 and at least two Si-bonded hydrogen atoms are present per molecule.

18. The mixture of claim 17, wherein the compound (C) is a siloxane comprising units of the formulae (2) and (4) with the proviso that at least two radicals $R^{21}$ and at least two Si-bonded hydrogen atoms are present per molecule.

19. The mixture of claim 11, wherein the compound (B) is an organosilicon compound (B) comprising units of the formula (4):

$$R^{20}_h H_i SiO_{(4-h-i)/2} \quad (4),$$

wherein
$R^{20}$ is a monovalent radical $R^a$ or $R^b$,
h is 0,1, 2 or 3, and
i is 0, 1 or 2,
with the proviso that h+i≤3 and at least two Si-bonded hydrogen atoms are present per molecule.

20. The mixture of claim 11, wherein the mixture is crosslinkable via organic peroxide(s) (D2).

21. A mixture crosslinkable to provide a dielectric vulcanizate, the mixture comprising:
at least one compound comprising at least one unit of the formula (1):

$$R^1_a R^2_b SiO_{(4-a-b)/2} \quad (1)$$

wherein
$R^1$ is a monovalent $C_1$-$C_{20}$-hydrocarbon radical,
$R^2$ is a radical —CR$^3$R$^4$—X, and
X is a radical —F, —Cl, —Br, —I, —CN, —NO$_2$, —P(O)(OR$^5$)$_2$, —SO$_2$—(O)$_c$—R$^6$, —(O)$_d$(OC)$_e$—R$^7$, —NR$^8$—COR$^9$ or —O—SiR$^{10}_3$,
$R^3$, $R^4$ are hydrogen or monovalent $C_1$-$C_{20}$-hydrocarbon radicals,
$R^5$, $R^6$, $R^7$, $R^8$, $R^9$, $R^{10}$ are monovalent $C_1$-$C_{20}$-hydrocarbon radicals,
a is 0, 1 or 2,
b is 1, 2 or 3,
c and d are 0 or 1, and
e is 0 or 1,
with the proviso that a+b≤3, and
a compound (A) and a compound (B), wherein the compound (A) has at least two aliphatically unsaturated radicals and the compound (B) has at least three Si-bonded hydrogen atoms or the compound (A) has at least three aliphatically unsaturated radicals and the compound (B) is a siloxane having at least two Si-bonded hydrogen atoms, or
a siloxane (C) having both aliphatic carbon-carbon multiple bonds and Si-bonded hydrogen atoms and either optionally a compound (A) or a compound (B), wherein the compound (A) has at least two aliphatically unsaturated radicals and the compound (B) is a siloxane having at least two Si-bonded hydrogen atoms; or optionally a mixture of the compound (A) and the compound (B) wherein the compound (A) has at least two aliphatically unsaturated radicals and the compound (B) is a siloxane having at least three Si-bonded hydrogen atoms or the compound (A) has at least three aliphatically unsaturated radicals and the compound (B) is a siloxane having at least two Si-bonded hydrogen atoms.

22. The mixture of claim 21, wherein a plurality of units of the formula (1) are contained in at least one of the crosslinkable compounds (A), (B), and/or (C).

23. The mixture of claim 21, wherein the composition comprises crosslinkable compounds (A) and (B), and wherein compounds (A) and (B) each comprise 10 mol percent or more of units of the formula (1).

24. The mixture of claim 21, wherein the crosslinkable mixture, following crosslinking, has an electric breakdown voltage in accordance with ASTM D 3755 of at least 50 kV/mm, and a permittivity at 10 hz of at least 1200.

25. The mixture of claim 21, wherein the mixture is crosslinkable via organic peroxide(s) (D2).

* * * * *